(12) United States Patent  
Biersack

(10) Patent No.: US 12,098,827 B2
(45) Date of Patent: Sep. 24, 2024

(54) ADJUSTABLE-HEIGHT PENDANT LUMINAIRE

(71) Applicant: OCCHIO GMBH, Munich (DE)

(72) Inventor: Anton Biersack, Pucheim (DE)

(73) Assignee: OCCHIO GMBH, Munich (DE)

( * ) Notice: Subject to any disclaimer, the term of this patent is extended or adjusted under 35 U.S.C. 154(b) by 0 days.

(21) Appl. No.: 17/910,727

(22) PCT Filed: Mar. 10, 2021

(86) PCT No.: PCT/EP2021/056070
§ 371 (c)(1),
(2) Date: Sep. 9, 2022

(87) PCT Pub. No.: WO2021/180798
PCT Pub. Date: Sep. 16, 2021

(65) Prior Publication Data
US 2023/0175675 A1  Jun. 8, 2023

(30) Foreign Application Priority Data
Mar. 11, 2020 (DE) .......................... 102020106686.4

(51) Int. Cl.
F21V 21/15 (2006.01)
F21S 8/06 (2006.01)
(Continued)

(52) U.S. Cl.
CPC .............. F21V 21/15 (2013.01); F21S 8/061 (2013.01); F21V 21/38 (2013.01); F21V 23/0471 (2013.01)

(58) Field of Classification Search
CPC .................................. F21S 8/061; Y02B 20/40
See application file for complete search history.

(56) References Cited

U.S. PATENT DOCUMENTS 11,473,762 B2 * 10/2022 Kim ...................... F24F 13/078
2013/0294067 A1 11/2013 Engel-hall et al.
(Continued)

FOREIGN PATENT DOCUMENTS

DE  202016101262 U1  6/2017
EP  2506686 A2  10/2012
EP  2822360 A2  1/2015

OTHER PUBLICATIONS

International Search Report of the International Searching Authority directed to related International Patent Application No. PCT/EP2021/056070, mailed May 28, 2021, with attached English-language translation; 5 pages.

Primary Examiner — Zheng Song
(74) Attorney, Agent, or Firm — Sterne, Kessler, Goldstein & Fox P.L.L.C.

(57) ABSTRACT

An adjustable-height pendant luminaire is proposed which comprises the following: a luminaire head, a ceiling mounting unit from which the luminaire head is suspended by means of cables, a height adjustment unit arranged in the ceiling mounting unit, a sensor arrangement having at least one sensor arranged on the luminaire head, wherein the at least one sensor is configured as a near-field sensor designed to detect a hand of a user in the proximity of the sensor for the detecting of gestures as non-contact control commands, and a control unit in communicative connection with the sensor arrangement and the height adjustment unit. The control unit is configured to send a control command to the height adjustment unit for changing the vertical position of the luminaire head upward or downward.

10 Claims, 3 Drawing Sheets

Figure 1:
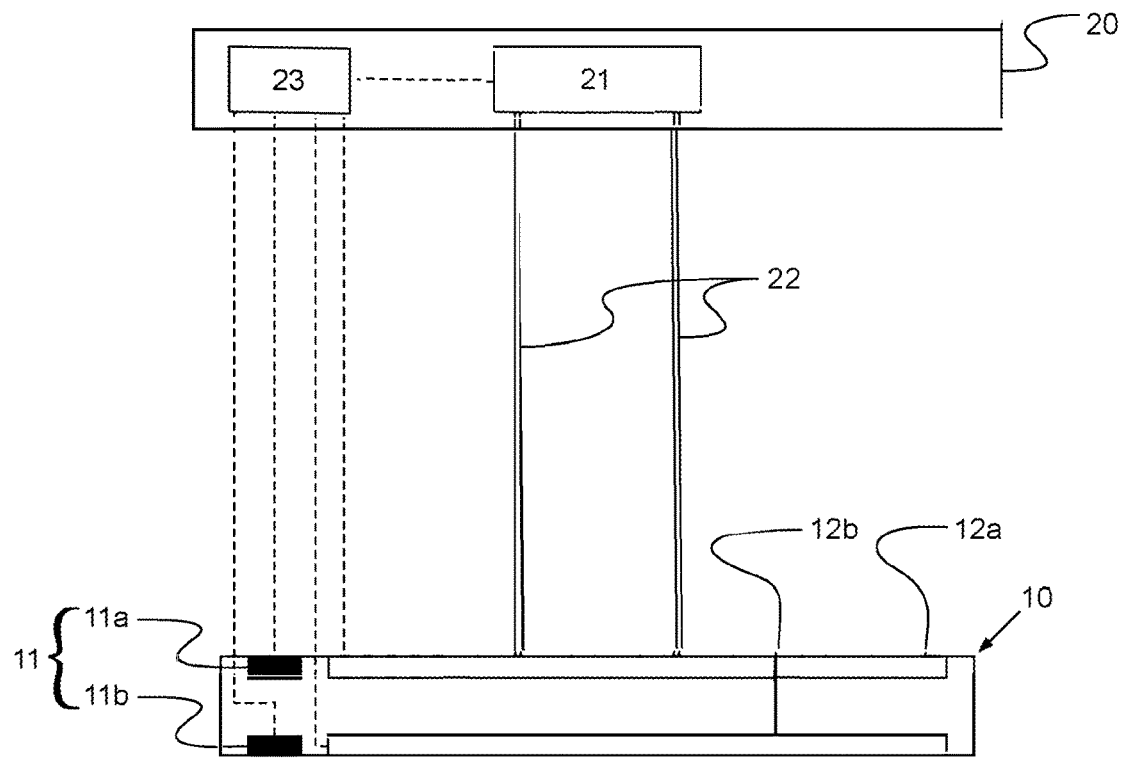

(51) Int. Cl.
*F21V 21/38* (2006.01)
*F21V 23/04* (2006.01)

(56) References Cited

U.S. PATENT DOCUMENTS

| | | | |
|---|---|---|---|
| 2015/0373806 A1* | 12/2015 | Vissenberg | H05B 45/20 |
| | | | 315/151 |
| 2018/0180233 A1* | 6/2018 | Mellor | F21S 8/061 |
| 2019/0195478 A1* | 6/2019 | Hayrapetian | F21V 21/38 |
| 2022/0196226 A1* | 6/2022 | Kim | F21V 33/0064 |
| 2022/0325877 A1* | 10/2022 | Doss | A01G 9/249 |
| 2023/0034181 A1* | 2/2023 | DuFresne | F21V 21/15 |

* cited by examiner

ADJUSTABLE-HEIGHT PENDANT LUMINAIRE

The present invention relates to an adjustable-height pendant luminaire in accordance with the subject matter of claim 1.

Adjustable-height pendant luminaires having a luminaire head suspended from a ceiling mounting unit by means of cables are known from the prior art. For instance, DE 20 2007 017 625 U1 describes an adjustable-height pendant luminaire in which the cables for suspending the luminaire head are rolled onto mechanically pretensioned winding drums affixed to the ceiling. The winding drums have a winder brake to keep the suspended luminaire head in its active vertical position, which prevents the cables rolled onto the winding drums from unintended unwinding.

To adjust the vertical position of the luminaire head, the user grasps the luminaire head and manually moves it up or down. The cables suspending the luminaire head are thereby rolled onto or off of the winding drum so as to enable a change in the length of the cable sections between the winding drums and the luminaire head, and thus the vertical position of the luminaire head.

Needing to move the luminaire head manually in order to adjust the vertical position, or the height of the luminaire head respectively, is perceived as being disadvantageous relative to the known adjustable-height pendant luminaire. If an excessive pulling force is applied, there is a risk that the pendant luminaire will detach from the ceiling and become damaged. In addition, the luminaire head can become dirtied when the user adjusts the height.

In light of this, it is a task of the present invention to specify an adjustable-height pendant luminaire having the most intuitive and simplest operation possible and in which particularly the height or vertical position respectively of the luminaire head can be adjusted as conveniently and safely as possible.

This task is solved by an adjustable-height pendant luminaire having the features of claim 1. Advantageous further developments are yielded by the dependent claims.

The task of the invention is in particular solved by an adjustable-height pendant luminaire which has a luminaire head, a ceiling mounting unit from which the luminaire head is suspended by means of cables, a height adjustment unit arranged in the ceiling mounting unit, a sensor arrangement having at least one sensor arranged on the luminaire head, wherein the at least one sensor is configured as a near-field sensor designed to detect a user's hand in the proximity of the sensor in order to detect gestures as non-contact control commands, and a control unit in communicative connection with the sensor arrangement and the height adjustment unit. The control unit is thereby configured to send a control command to the height adjustment unit for changing the vertical position of the luminaire head upward or downward upon a first gesture being detected at the sensor arrangement and, upon a second gesture being detected at the sensor arrangement, to send a control command to the height adjustment unit for changing the vertical position of the luminaire head downward or upward, and the height adjustment unit is configured to vertically change the position of the luminaire head according to the control commands received from the control unit.

An essential point of the invention lies in the idea of not providing any mechanically actuable mechanism for the height adjustability of the luminaire head but rather realizing the height adjustment by means of a controllable height adjustment unit. The corresponding control commands for moving the luminaire head up or down are thereby generated by means of the non-contact detection of gestures that a user makes in direct proximity of the sensor arrangement affixed to the luminaire head.

The pendant luminaire according to the invention provides an extremely convenient solution for the height adjustability of the luminaire head. On the one hand, it is not necessary to touch the pendant luminaire such that there is no risk of damaging or dirtying the pendant luminaire. On the other hand, the gesture-based control of the pendant luminaire's height adjustment provides an intuitive, easily understood adjustment alternative which does not require any additional devices to adjust the height of the luminaire head.

In the context of the present invention, the vertical direction denotes a direction (substantially) along the effective direction of gravity.

The ceiling mounting unit serves in installing the pendant luminaire on a ceiling or an outdoor roofing. The cables for suspending the luminaire head from the ceiling mounting unit are preferably electrical cables which at the same time serve in supplying power to light sources in the luminaire head. The cables can further be provided for communication, particularly for the transmission of sensor data and/or control commands. Alternatively, the cables can be designed as cords, for example metal cords, and the luminaire head power supply can be provided via separate lines.

The height adjustment unit serves in adjusting the height of the luminaire head. This is thereby advantageously effected by the height adjustment unit being able to change the length of the cable sections between the ceiling mounting unit and the luminaire head. In one exemplary embodiment, the height adjustment unit has a drum for each cable provided for suspending the pendant luminaire onto which part of the cable is wound. In order to effect height adjustment, the drum for each cable is coupled to a drive which rotates the drum upon receiving a control command so as to wind or unwind the cable and thus change the length of the cable section between the ceiling mounting unit and the luminaire head. The height adjustment unit can also be formed by other types of mechanisms. The key factor is that the height adjustment unit is suited to changing the vertical position of the luminaire head pursuant to received control commands.

The inventive sensor arrangement comprises one or more near-field sensors suited to detecting a user's hand in the vicinity of the sensor. For example, an infrared sensor can be used as a near-field sensor which detects infrared radiation emitted by the user's hand when it enters into the detection area. The sensor arrangement can furthermore comprise radiation sources, for example infrared light sources, as well as corresponding sensors which detect radiation emitted by the radiation sources and reflected by an object in the detection area. Any type of sensor that reacts to non-contact closeness; i.e. without any direct contact being made, can likewise be used as the near-field sensor. Possible embodiments of near-field sensors include inductive or capacitive proximity sensors, light barriers or ultrasonic proximity switches that emit an ultrasonic signal and react to the reflection of the ultrasonic signal on an object in the proximity of the sensor.

What matters is that the sensor arrangement comprises sensors which allow non-contact actuation or respectively triggering of the sensors so as to register control commands without contact. The detection area of the near-field sensors is close to the sensor and is preferably at a maximum distance of less than 20 cm from the near-field sensor, further preferentially less than 10 cm. All that is crucial is that the near-field sensor has a detection area for objects, in particular the hand of a user, which is small enough to prevent unintentional triggering of control commands on the one hand yet, on the other hand, large enough to allow non-contact generating of control commands by means of gestures.

The gestures that can be used to generate control commands are not particularly limited. Typically, near-field sensors distinguish between a state in which there is no object such as a user's hand near the sensor and a state in which an object such as a user's hand is in close proximity to the sensor. Gestures can for example be characterized by the length of time the object remains in proximity to the sensor and can be detected on that basis. For example, a gesture can be characterized by a maximum dwell time of an object in the detection area of the near-field sensor or by a minimum dwell time of an object in the detection area of the near-field sensor. Gestures can likewise be characterized and detected based on an object repeatedly entering and exiting the detection area, this realizable by a hand moving back and forth repeatedly through the detection area.

Different gestures can likewise be detected by the sensor arrangement comprising a plurality of spaced-apart near-field sensors or sensors with directivity and different alignment. A first gesture could be characterized by a near-field sensor being triggered for a predetermined minimum duration, e.g. at least a second or half a second, and a second gesture by the corresponding triggering of a further near-field sensor for the predetermined minimum duration. What matters is that the sensor arrangement is suited to detecting at least two different distinguishable gestures.

In one particularly preferential embodiment, the first or respectively second gesture is detected when an object such as a user's hand, for example, remains in the detection area of a sensor associated with the first/second gesture for longer than a predetermined minimum period such that the sensor is triggered for a longer period of time than a predetermined minimum duration. The control unit and the height adjustment unit are thereby configured to perpetuate the movement of the luminaire head for as long as the hand remains within the detection area of the sensor.

As soon as the hand moves out of the sensor's detection area, the movement of the luminaire head stops. According to this embodiment, the duration of the luminaire head movement in the vertical direction thus corresponds to the duration of the sensor triggering. This can thereby achieve a particularly intuitive method for adjusting the height of the luminaire head.

The control device can be configured such that the detection of the first gesture effects the sending of a control command to the height adjustment unit for changing the position of the luminaire head in the upward vertical direction. The detection of the second gesture effects the sending of a control command for changing the position of the luminaire head in the downward vertical direction. The control device can also be inventively configured for a reversed allocation of the first and the second gesture to the control commands. In this case, the detection of the first gesture effects the sending of a control command to the height adjustment unit for changing the position of the luminaire head in the downward vertical direction whereas the detection of the second gesture effects the sending of a control command for changing the position of the luminaire head in the upward vertical direction.

The control unit according to the invention comprises a central processing unit, for example a microcontroller or another processor unit, and is designed to receive and evaluate signals detected by the sensor arrangement in order to associate the detected signals with different gestures. When the sensor arrangement comprises one near-field sensor, the control unit can be configured to detect the length of time during which the near-field sensor is triggered by an object in the detection area and to characterize various gestures based on the duration of the sensor signal.

When the sensor arrangement comprises a plurality of near-field sensors, different gestures can be detected by the triggering of different near-field sensors. Gestures can likewise be characterized by multiple near-field sensors being simultaneously triggered. A combination of triggering duration evaluation and number or respectively identity of the triggered near-field sensors also enables the sensor arrangement to detect different gestures. Again, what remains crucial is that at least two different gestures can be detected.

Once the gesture has been detected and identified, the control unit is further configured to generate a control command corresponding to the identified gesture and send it to the height adjustment unit. The control unit can thus detect a first gesture which leads to the generating and sending of a control command prompting the height adjustment unit to move the luminaire head in the upward vertical direction. Upon detection of a second distinguishable gesture, the control unit generates and sends a control command to the height adjustment unit which leads to the luminaire head moving in the downward vertical direction. This thereby enables a non-contact, gesture-based adjustment of the height of the luminaire head.

The control unit can be integrated into the luminaire head or accommodated in the ceiling mounting unit. The communicative connection to the sensor arrangement and the height adjustment unit can be wired, e.g. through appropriate electrical connections. The electrical connection can be at least partially or entirely formed by the cables between the luminaire head and the ceiling mounting unit. The communicative connection can likewise be realized via wireless transmission, for example via Bluetooth or similar interface.

The control unit can also be configured to establish a communicative connection to an external device, for example a mobile phone or tablet, via which the control commands described in the context of the present invention can also be triggered. The gesture-based control can in this case be freely combined with the controller via the external device, for example by the external device triggering a control command to vertically move the luminaire head and a gesture control triggering a control command to stop the movement or vice versa.

In one preferential embodiment of the invention, the luminaire head comprises at least one light source which is in communicative connection with the control unit and configured to change its brightness according to control commands received from the control unit. This allows simple adjustment of the brightness of the pendant luminaire. According to one possible development of the invention, the communicative connection to the control unit allows the change in brightness of the at least one light source to be controlled by corresponding gestures detected by the sensor arrangement and converted by the control unit into corresponding control commands to the at least one light source.

The at least one light source can comprise for example a plurality of light-emitting diodes arranged in the luminaire head, e.g. alongside each other in a row.

In a further preferential embodiment, the control unit can be switched between a first mode for vertically changing the position of the luminaire head and a second mode for changing the brightness of the at least one light source.

In a further preferential embodiment, the control unit is configured to switch from the second mode to the first mode when a third mode switching gesture is detected at the sensor arrangement. The sensor arrangement and/or the control unit are thus configured to detect a third gesture. Switching from the first mode into the second mode can then be triggered by the third gesture detected at the sensor arrangement. This simplifies the operation of the pendant luminaire since the user can selectively control either the brightness or the height of the pendant luminaire.

In a further preferential embodiment, the control unit is configured to automatically switch from the first mode to the second mode after having been in the first mode for a predetermined time with no gestures having been detected. This further simplifies the operation of the pendant luminaire. The automatic changing into the second mode ensures that a user who is unfamiliar with the operation can at first only change the brightness of the pendant luminaire. The function for luminaire head height adjustment, which is much less frequently required in normal use, must then first be triggered by the third gesture before the vertical position of the luminaire head can be adjusted with the first and second gesture. The predetermined time until the control unit switches to the second mode can for example be 10 seconds or 5 seconds.

It is further preferential for the control unit to be configured to send a control command for brightness change to the at least one light source when the first gesture and/or the second gesture is detected in the second mode. This enables using the first and second gestures, which serve in adjusting the height of the luminaire head in the second mode, to adjust the brightness of the at least one light source in the first mode. This leads to a further simplification of operation since fewer distinguishable gestures are needed to adjust both the height of the luminaire head as well as the brightness of the pendant luminaire.

It is further preferential for the control unit to be configured to detect a fourth and a fifth gesture. A fourth and fifth gesture can for example be characterized by an object, in particular a user's hand, being detected in the detection area of a sensor of the sensor arrangement for less than a predetermined minimum duration. This corresponds to a quick movement of the user's hand through the detection area of the sensor.

The control unit can thereby be configured to send a control command for the continuous upward or downward vertical movement of the luminaire head upon detection of the fourth or fifth gesture in the first mode when the luminaire head is in a motionless state upon the fourth or fifth movement being detected. The height adjustment unit is thereby configured such that the movement of the luminaire head upon the control command being received does not stop once the gesture has stopped. The movement of the luminaire head does not stop until the height adjustment unit receives a further control command to stop the motion. The control unit is configured to send the control command for stopping the movement to the height adjustment unit as soon as a specific or even any arbitrary gesture is detected.

This embodiment enables the height adjustment to be of particularly convenient design since in contrast to the height adjustment using the first and second gestures, the user does not have to keep his hand in a detection area of the sensor arrangement for the entire duration of the movement. When the control unit is configured to send the command to end the movement of the luminaire head upon any gesture being detected, the operating safety of the pendant luminaire is additionally increased since the control command can in this case also be triggered by an object intruding into a detection area of the sensor arrangement and with which the luminaire head would have collided had it not stopped moving.

In a further preferential embodiment, the sensor arrangement comprises a first sensor, in particular a first near-field sensor, and a second sensor, in particular a second near-field sensor, whereby the sensor arrangement is configured to detect the first gesture when a user's hand is detected at the first sensor for a predetermined minimum time, to detect the second gesture when a user's hand is detected at the second sensor for a predetermined minimum time, and to detect the third gesture for mode switching when a user's hand is simultaneously detected at the first sensor and the second sensor for a predetermined minimum time or for a shorter period than a predetermined minimum time. The first sensor and the second sensor are preferably affixed to the luminaire head such that the detection areas of the two sensors are spaced apart from each other. This configuration enables realizing a particularly simple operation of the pendant luminaire. The third gesture can be characterized either by the simultaneous detection of an object at the first sensor and at the second sensor for a predetermined minimum time (or longer) or by a shorter simultaneous detection of an object at the first sensor and at the second sensor than a predetermined minimum time. The alternative which was not utilized can then be used as a further gesture for controlling other functions of the pendant luminaire.

By detecting the first gesture and the second gesture using spaced near-field sensors, the gestures required to adjust the height of the pendant luminaire can be of particularly simple form since to trigger the control commands, the user only needs to hold his hand at a specific point near the luminaire head for a predetermined minimum time. For the mode switching, the user triggers both sensors by using both hands to activate the sensors simultaneously. If the detection areas of the sensors are sufficiently close enough to each other, the third gesture can also be made with one hand by the one hand entering into both detection areas. The predetermined minimum time leading to the detection of the first, second and third gesture can be e.g. a second or half a second. The control unit can be further configured to execute the control activated by the first and second gestures as long as the associated sensor remains activated. This allows a continuous adjustment of the pendant luminaire's height since the height adjustment unit changes the vertical position of the luminaire head upward or downward for as long as the first sensor or respectively second sensor detects the user's hand in the respective sensor's proximity.

It is further preferential, particularly in the case of the embodiment just described, for the luminaire head to comprise a first light source and a second light source, each of which is in communicative connection with the control unit and configured to change its brightness according to control commands received from the control unit. The first sensor can thereby preferably be used to change the brightness of the first light source and the second sensor used to change the brightness of the second light source. This thereby allows the realizing of a pendant luminaire having particularly variable illumination properties.

The control unit is further preferably configured to change the brightness of the first light source when the first gesture is detected in the second mode and change the brightness of the second light source when the second gesture is detected in the second mode. A simple and intuitive operation of the pendant luminaire can thereby be realized since the same gestures are used to adjust the brightness of the light sources as are to adjust the height of the luminaire head.

In a further preferential embodiment, the luminaire head has an upper side and a lower side, whereby the first sensor and the first light source are arranged on the upper side of the luminaire head, and the second sensor and the second light source are arranged on the lower side of the luminaire head. The operation of the pendant luminaire is thereby designed to be particularly simple and intuitive.

When the control unit is in the first mode for changing the vertical position of the luminaire head, an upward movement of the luminaire head can be triggered by a user holding his hand in the detection area of the first sensor on the upper side of the luminaire head for a predetermined minimum time. As soon as the first gesture is detected and the luminaire head moves upward, the user can move his hand upward along with the luminaire head and the luminaire head follows the user's hand movement for as long as the hand remains near the sensor;
i.e. within the detection area of the first sensor.

Analogously, the luminaire head follows a movement of a user's hand downward when the user holds his hand in the detection area of the second sensor for a predetermined minimum time and it follows the user's hand for as long as the hand remains in the detection area of the second sensor. Switching into the second mode for adjusting the brightness of the light sources ensues by simultaneously activating both sensors for a predetermined minimum time.

In the second mode, the brightness of the first light source on the upper side of the luminaire head can be changed by holding a hand in the detection area of the first sensor on the upper side of the luminaire head. The brightness of the second light source on the lower surface of the luminaire head ensues analogously by holding a hand in the detection area of the second sensor on the lower side of the luminaire head. As long as the hand remains within the detection area of the respective sensor, the brightness of the first and second lighting source can in turn continue to be changed. A particularly simple and safe operation of the pendant luminaire is thus realized by non-contact, gesture-based control.

The invention will also be described in the following in terms of further features and advantages, the same being clarified based on the figures.

Figure 2:
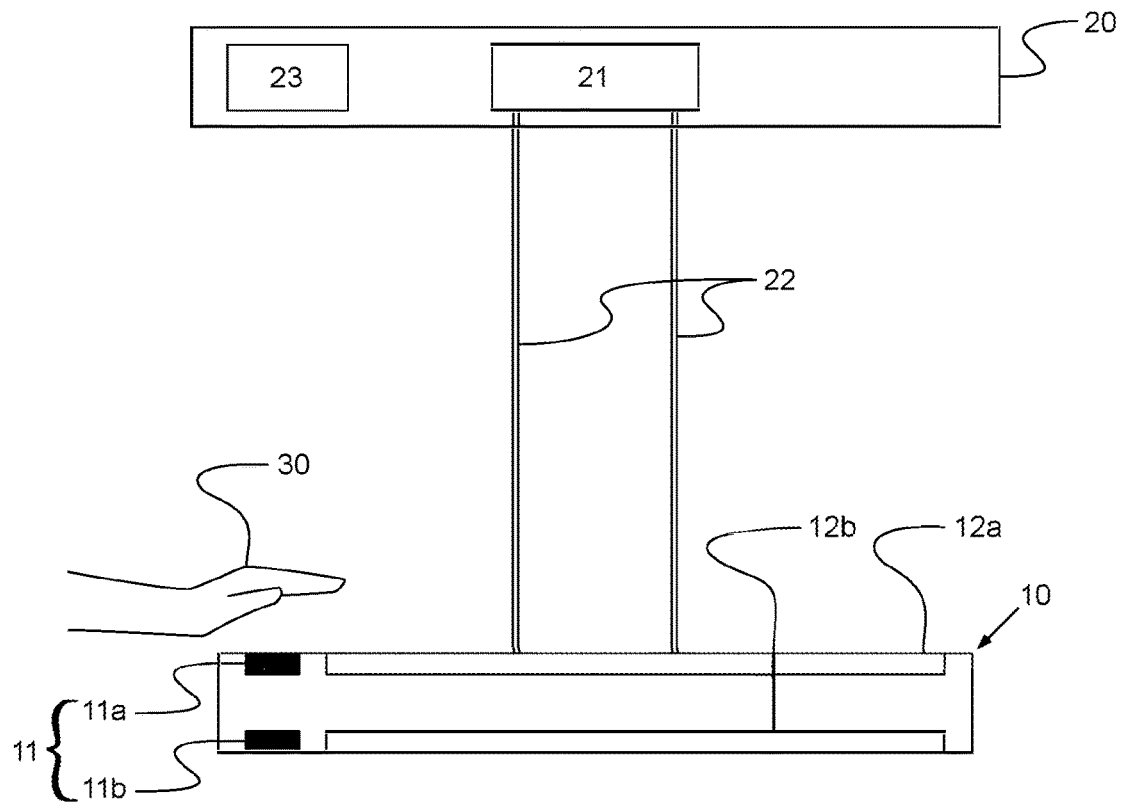
Figure 3:
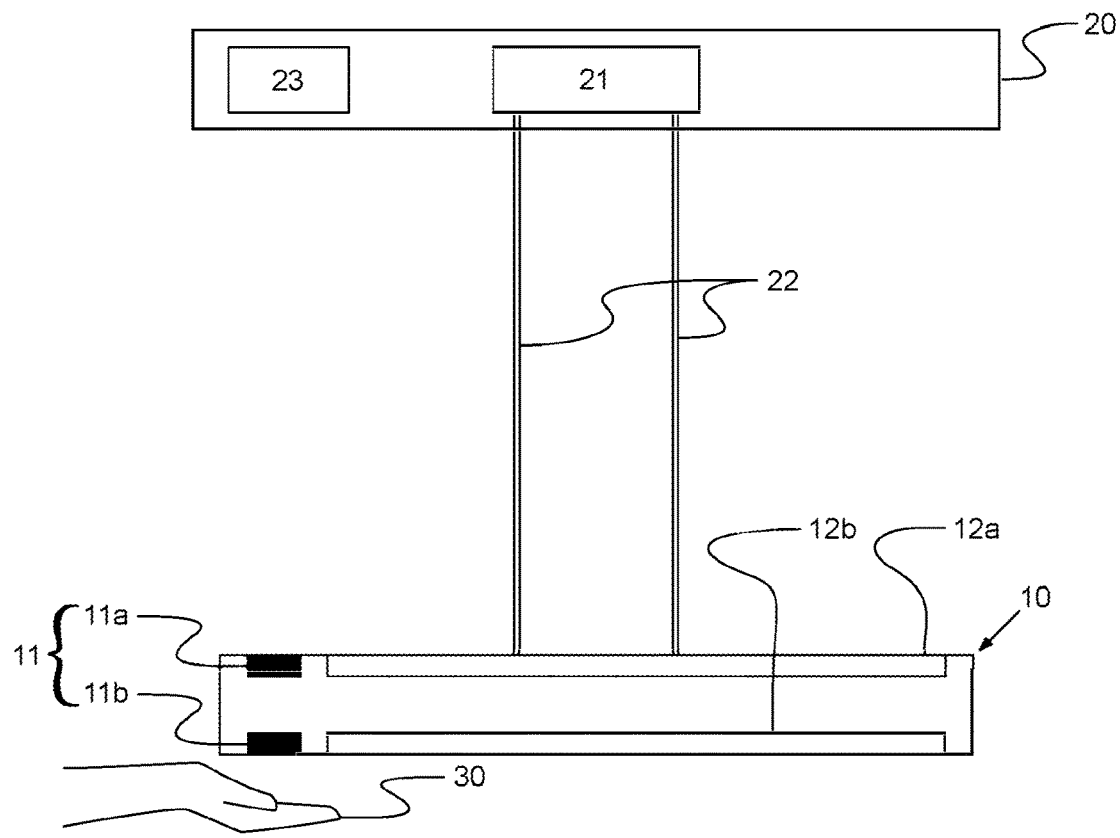
Figure 4:
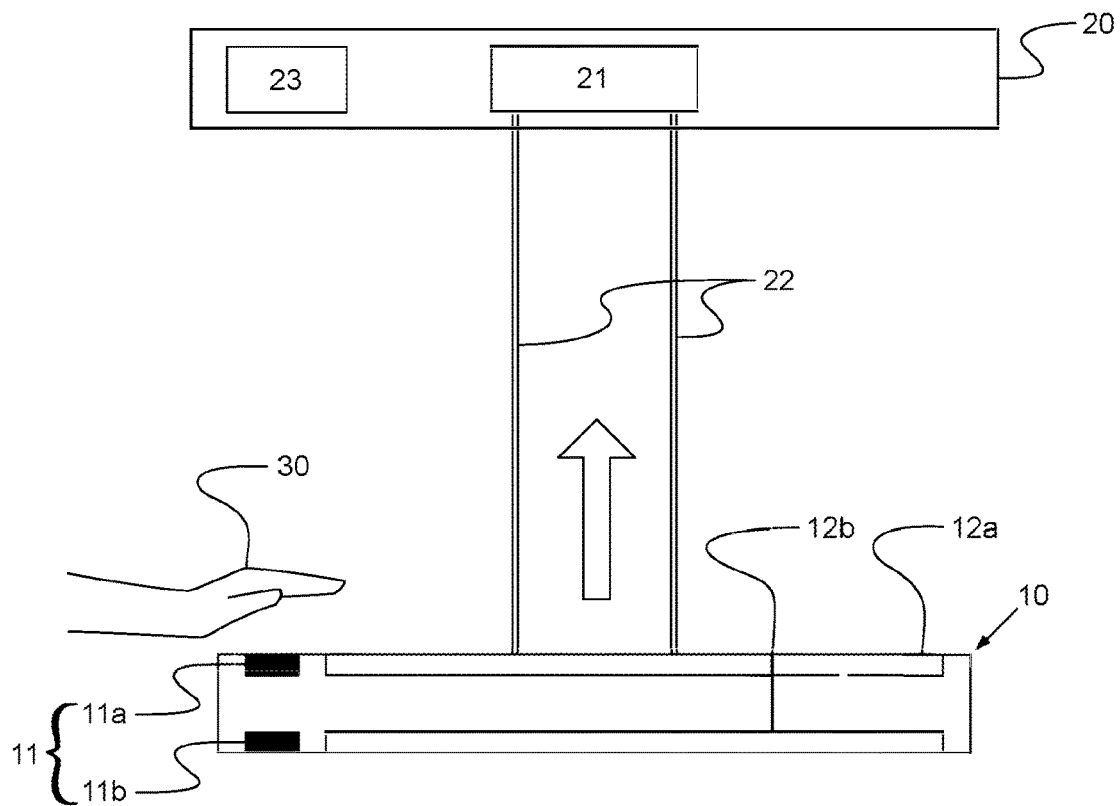
Figure 5:
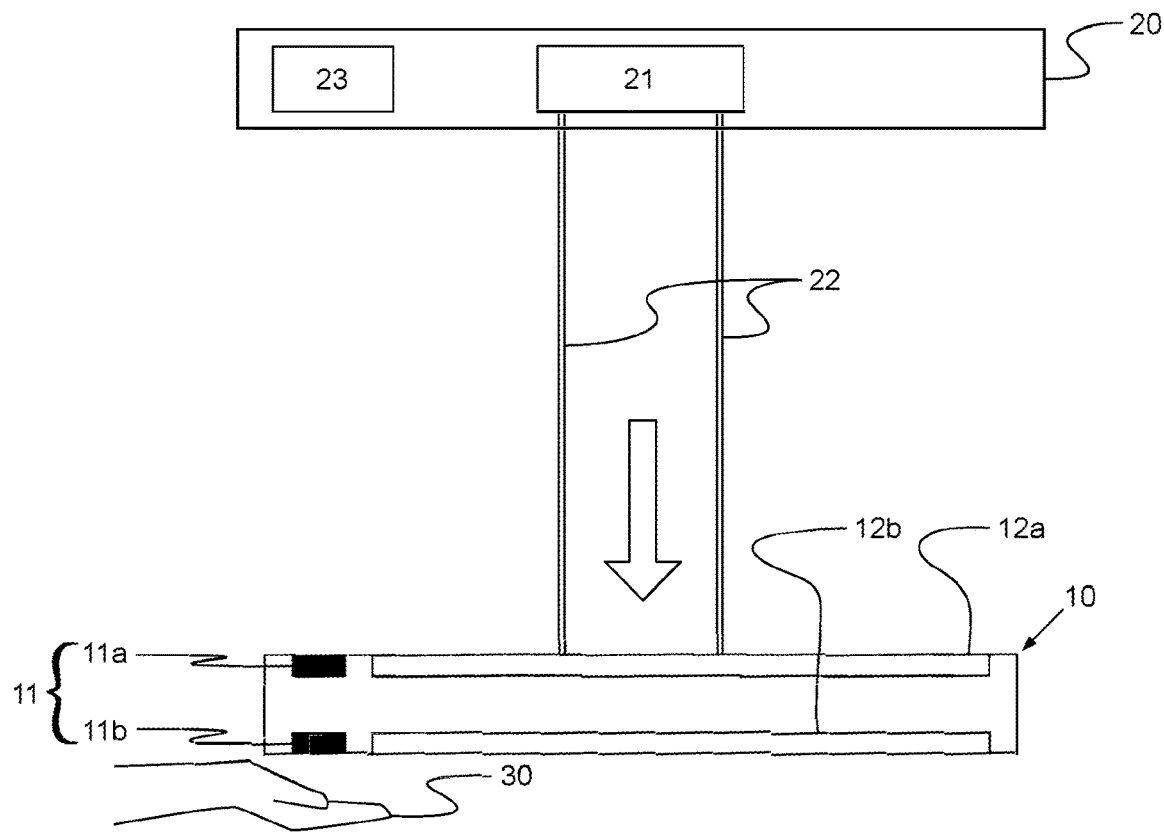
Figure 6:
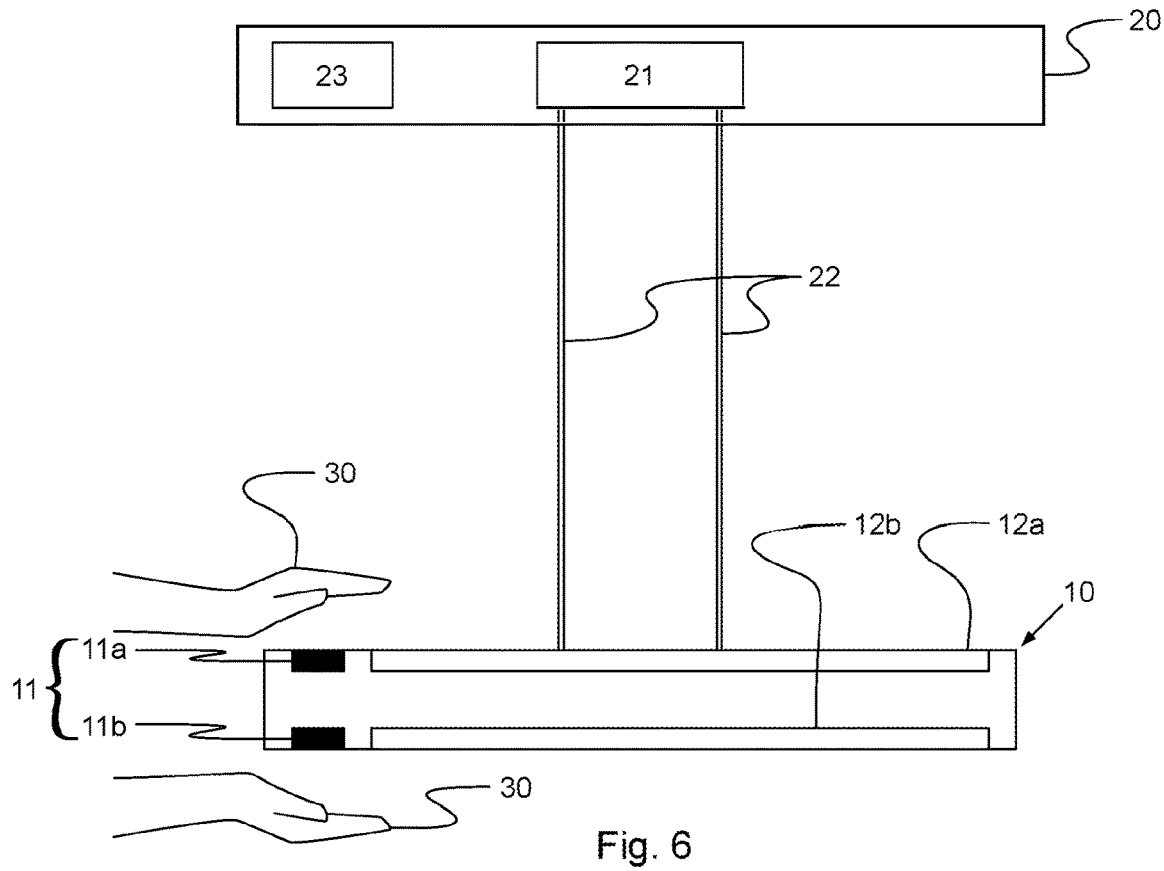

Thereby shown:

FIG. 1 an exemplary embodiment of a pendant luminaire according to the present invention;

FIG. 2 the pendant luminaire from FIG. 1, with a user making a first gesture for the non-contact control of the pendant luminaire;

FIG. 3 the pendant luminaire from FIG. 1, with a user making a second gesture for the non-contact control of the pendant luminaire;

FIG. 4 the pendant luminaire from FIG. 1 during the upward change in the vertical position of the luminaire head;

FIG. 5 the pendant luminaire from FIG. 1 during the downward change in the vertical position of the luminaire head; and FIG. 6 the pendant luminaire from FIG. 1 with a user making a third gesture for switching the mode of a pendant luminaire control unit.

FIG. 1 shows an exemplary embodiment of a pendant luminaire according to the present invention. The pendant luminaire comprises a luminaire head 10 which is suspended from a ceiling mounting unit 20 by means of cables 22. The luminaire head 10 comprises a first light source 12a and a second light source 12b, respectively arranged on the upper side/lower side of the luminaire head 10.

The first light source 12a and the second light source 12b each extend along the respective upper and lower side of the luminaire head 10 and are formed in the present exemplary embodiment by a plurality of light-emitting diodes arranged next to each other along the horizontal direction of extension of the luminaire head 10. The light sources 12a, 12b are infinitely dimmable. In the embodiment shown in FIG. 1, the luminaire head 10 is essentially cuboid. According to the invention, however, the shape of the luminaire head 10 is not limited to a cuboid shape. For example, the luminaire head 10 can equally be substantially flat or of ring shape.

The luminaire head 10 further comprises a sensor arrangement 11, which is formed by a first sensor 11a on the upper side of the luminaire head 10 and a second sensor 11b on the lower side of the luminaire head 10 in the present exemplary embodiment. The following will describe the configuration and design of the sensor arrangement 11 in greater detail.

The cables 22 serve to affix the luminaire head 10 to the ceiling mounting unit 20 and as the power supply of the luminaire head 10. The cables 22 lead to a height adjustment unit 21 that is fit into the ceiling mounting unit 20. The height adjustment unit 21 is thereby designed to change the length of the sections of cable 22 between the ceiling mounting unit 20 and the luminaire head 10 in order for the height, or vertical position of the luminaire head 10 respectively, to thereby be able to be adjusted. To adjust the height of the luminaire head 10, the height adjustment unit 21 can be electrically controlled; the height of the luminaire head 10 is likewise adjusted electrically. According to the invention, the mechanism used to that end is not subject to any particular limitation and can for example be formed by motor-driven drums onto which the cables 22 are wound or unwound.

A control unit 23 in communicative connection with the sensors 11a, 11b of the sensor arrangement 11, the light sources 12a, 12b and the height adjustment unit 21 is further arranged in the ceiling mounting unit 20. The communicative connections are depicted in FIG. 1 by dashed lines. The communicative connections can be wired—in the case of the height adjustment unit 21, by a cable in the ceiling mounting unit 20 and in the case of the luminaire head components, by for example cable 22—or be provided by wireless interfaces.

The sensors 11a, 11b of the sensor arrangement 11 are designed as near-field sensors and generate a detection signal as soon as an object is in the proximity of the sensors 11a, 11b. In the exemplary embodiment shown, the sensors 11a, 11b are formed by infrared sensors. In one variant of the exemplary embodiment, the sensors 11a, 11b are configured to detect infrared light emitted by infrared sources (not shown) in the sensor arrangement 11 and reflected by objects in the detection area. Alternatively, the sensor arrangement 11 can be designed without infrared sources. In this case, the sensors 11a, 11b respond to infrared radiation emitted from a heat source such as, for example, a hand within the detection area. Upon detection of an object in the proximity of the sensor, the sensors 11a, 11b send a detection signal to the control unit 23. The detection signal continues to be transmitted to the control unit 23 for as long as an object remains in the proximity of the sensor in the respective detection area of the sensors 11a, 11b.

The control unit 23 receives the detection signals of the sensors 11a, 11b and registers the duration of the detection signals as well as information as to which sensor 11a, 11b sent the detection signal. The control unit 23 can thus distinguish between different gestures made by intrusions into the detection areas of the sensor arrangement 11.

FIG. 2 shows the pendant luminaire from FIG. 1 with a user making a first gesture. The gesture is characterized by a user reaching a hand 30 into the detection area of the first sensor 11a. The control unit 23 registers the duration of the intrusion into the detection area of the first sensor 11a and, if the intrusion lasts longer than a predetermined minimum time, e.g. longer than a second or half a second, identifies the movement as a first gesture.

FIG. 3 shows the pendant luminaire from FIG. 1 with a user making a second gesture. The second gesture is characterized by a user moving a hand 30 within the detection area of the second sensor 11b. The control unit 23 registers the duration of the intrusion within the detection area of the second sensor 11a and, if the intrusion lasts longer than a predetermined minimum time, e.g. longer than a second or half a second, identifies the movement as a second gesture.

When the control unit 23 detects the first gesture, it sends a control signal to the height adjustment unit 21 which moves the luminaire head 10 upward in response to the control signal. This is depicted in FIG. 4, wherein the direction of movement of the luminaire head 10 is indicated by an arrow. Analogously, the detection of the second gesture results in a control signal being sent to the height adjustment unit 21 which, as shown in FIG. 5, triggers a downward movement of the luminaire head 10. The control unit 23 and the height adjustment unit 21 are thereby configured such that the upward or downward movement of the luminaire head 10 continues for as long as the hand 30 remains in the detection area of the first sensor 11a or the second sensor 11b respectively.

If the user moves his hand 30 along with the luminaire head 10 as the luminaire head 10 is moving, the luminaire head 10 follows the up or down movement of the user's hand 30 for as long as the hand 30 remains within the detection area of the sensor 11a/11b. Non-contact, intuitive height adjustment of the luminaire head 10 can thus be realized by gesture control.

According to one alternative exemplary embodiment, the associating of the gestures to the control commands is reversed. In this exemplary embodiment, the above-described detection of the first gesture in the detection area of the first sensor 11a effects the sending of a control command to the height adjustment unit 21 for vertically moving the luminaire head 10 downward. The detection of the second gesture in the detection area of the second sensor 11b effects the control unit 23 sending a control command to the height adjustment unit 21 for vertically moving the luminaire head 10 upward.

According to this embodiment, the luminaire head 10 moves away from the hand 30 of the user upon the first or second gesture being detected. When the user follows the movement of the luminaire head 10 with his hand 30, he can guide the luminaire head 10 with his hand 30 and push it ahead of his hand 30 without touching it. This represents an alternative, equally intuitive solution for the height adjustment of the luminaire head 10.

According to a further exemplary embodiment which can be combined with the previously described exemplary embodiments, the sensor arrangement 11 and the control unit 23 can be configured to detect a further third gesture. The third gesture is detected when the first sensor 11a and the second sensor 11b are simultaneously activated for a predetermined minimum time or for a shorter period than a predetermined minimum time. The third gesture is depicted in FIG. 6. A user simultaneously holds one respective hand 30 in the detection area of both the first and second sensors 11a, 11b. According to this embodiment, the control unit 23 can be switched between two modes when the third gesture is detected.

In a first mode, detection of the first or respectively second gesture effects the sending of a control command to the height adjustment unit 21 for moving the luminaire head 10 up or down, as described above with reference to FIGS. 4 and 5.

In a second mode, detection of the first or respectively second gesture effects the sending of a control command to the first light source 12a, or the second light source 12b respectively, for dimming the first light source 12a/second light source 12b. The brightness of the first light source 12a/second light source 12b continues to change for as long as the hand 30 of the user remains in the detection area of the first sensor 11a or second sensor 11b respectively.

In this exemplary embodiment, the control unit 23 is set in the second mode by default. The detection of the third gesture effects the switching of the control unit 23 into the first mode for a predetermined period of time of e.g. ten or five seconds. If the first or second gesture is detected during this time, the luminaire head 10 moves up or down. If no gesture is detected after the specified period of time, the control unit 23 automatically switches back into the second mode.

The sensor arrangement 11 and the control unit 23 can be used to detect further gestures. For example, a brief intrusion into the detection area of the first sensor 11a or second sensor 11b which lasts for a shorter period than the specified minimum time can register as a fourth or respectively fifth gesture. In the first mode, the luminaire head 10 can be moved to a respective preset vertical position upon detection of the fourth or fifth gesture. In the second mode, the first light source 12a/second light source 12b can be switched on and off upon detection of the fourth or respectively fifth gesture.

The fourth and fifth gestures can likewise be used in the first mode to start and stop the vertical movement of the luminaire head 10. In this case, upon detection of the fourth or fifth gesture, the control device 23 is configured to send a control command to the height adjustment unit 21 to continuously move the luminaire head 10 vertically up or down, if the luminaire head 10 was not moving prior to the gesture being detected.

Had the luminaire head 10 been moving prior to the gesture being detected, the control device 23 is further configured to send a control command to the height adjustment unit 21 to stop the vertical movement of the luminaire head 10 upon the detection of a specific gesture or detection of any given gesture.

Using the fourth and fifth gesture to adjust the height of the luminaire head 10 thus works as follows: If the luminaire head 10 is in a motionless state (and the first mode potentially activated as per the exemplary embodiment described with reference to FIG. 6), the user moves his hand 30 within the detection area of sensor 11a (fourth gesture) or 11b (fifth gesture) for a shorter period of time than a predetermined minimum time.

Depending on how the fourth and fifth gesture are associated with upward or downward movement, the control unit 23 is configured to send a control command to the height adjustment unit 21 for the continuous upward or downward vertical movement of the luminaire head 10 upon the detection of the fourth or fifth gesture. This control command is purely a start command for the movement of the luminaire head 10—the vertical movement does not stop when the user removes his hand 30 from the detection area of the sensor arrangement 11.

The movement of the luminaire head 10 does not end until a further gesture is detected at one of the sensors of the sensor arrangement 11.

This exemplary embodiment on the one hand enables the realizing of a particularly convenient height adjustment method since the user does not have to continuously keep his hand 30 in the detection area of sensor arrangement 11 during the height adjustment process. Additionally, the control unit 23 being configured to send a control command to stop the movement of the luminaire head 10 upon the detection of any arbitrary gesture increases the operating safety of the pendant luminaire since stopping the movement can in this case also be triggered by an obstacle intruding into the detection area of the sensor arrangement 11 during the vertical movement, with which the luminaire head 10 would have collided had it not stopped moving.

LIST OF REFERENCE NUMERALS 10 luminaire head
11 sensor arrangement
11a first (upper side) sensor
11b second (lower side) sensor
12a first (upper side) light source
12b second (lower side) light source
20 ceiling mounting unit
21 height adjustment unit
22 cable
23 control unit
30 hand

What is claimed is:

1. An adjustable-height pendant luminaire, comprising:
a luminaire head;
a ceiling mounting unit from which the luminaire head is suspended by means of cables;
a height adjustment unit arranged in the ceiling mounting unit;
a sensor arrangement arranged on the luminaire head, wherein the sensor arrangement is configured as a near-field sensor designed to detect a hand of a user in the proximity of the sensor arrangement for the detecting of gestures as non-contact control commands;
a control unit in communicative connection with the sensor arrangement and the height adjustment unit;
wherein the control unit is configured to send a control command to the height adjustment unit for changing the vertical position of the luminaire head upward or downward upon a first gesture being detected at the sensor arrangement and, upon a second gesture being detected at the sensor arrangement, to send the control command to the height adjustment unit for changing the vertical position of the luminaire head downward or upward;
wherein the height adjustment unit is configured to vertically change a position of the luminaire head according to control commands received from the control unit; and
wherein the luminaire head has an upper side and a lower side, and a first sensor of the sensor arrangement and a first light source is arranged on the upper side of the luminaire head, and a second sensor of the sensor arrangement and a second light source is arranged on the lower side of the luminaire head.

2. The adjustable-height pendant luminaire of claim 1, wherein the control unit is switchable between a first mode for vertically changing the position of the luminaire head and a second mode for changing the brightness of the first light source or the second light source.

3. The adjustable-height pendant luminaire of claim 2, wherein the control unit is configured to switch from the second mode to the first mode when a third mode switching gesture is detected at the first sensor and the second sensor.

4. The adjustable-height pendant luminaire of claim 3, wherein the sensor arrangement is:
configured to detect the first gesture when the hand of the user is detected at the first sensor for a first predetermined minimum time,
configured to detect the second gesture when the hand of the user is detected at the second sensor for a second predetermined minimum time, or
configured to detect the third mode switching gesture when the hand of the user is simultaneously detected at the first sensor and the second sensor for a third predetermined minimum time or for a shorter period than the first and second predetermined minimum time.

5. The adjustable-height pendant luminaire of claim 2, wherein the control unit is configured to automatically switch from the first mode to the second mode after having been in the first mode for a predetermined period of time.

6. The adjustable-height pendant luminaire of claim 2, wherein the control unit is configured to send a control command for brightness change to the first light source or the second light source when the first gesture or the second gesture is detected in the second mode.

7. The adjustable-height pendant luminaire of claim 1, wherein the first light source and the second light source are in communicative connection with the control unit and configured to change their brightness according to the control commands received from the control unit.

8. The adjustable-height pendant luminaire of claim 1, wherein the sensor arrangement and the control unit are communicatively connected by wireless interfaces.

9. The adjustable-height pendant luminaire of claim 1, wherein the sensor arrangement and the control unit are communicatively connected via wired connections.

10. The adjustable-height pendant luminaire of claim 1, wherein the sensor arrangement comprises infrared sensors.

* * * * *